United States Patent
Purcell et al.

(10) Patent No.: US 6,415,311 B1
(45) Date of Patent: Jul. 2, 2002

(54) SIGN EXTENSION CIRCUIT AND METHOD FOR UNSIGNED MULTIPLICATION AND ACCUMULATION

(75) Inventors: Stephen C. Purcell, Mountain View; Nital P. Patwa, San Jose, both of CA (US)

(73) Assignee: ATI International Srl, West Indies (BB)

( * ) Notice: Subject to any disclaimer, the term of this patent is extended or adjusted under 35 U.S.C. 154(b) by 0 days.

(21) Appl. No.: 09/344,175

(22) Filed: Jun. 24, 1999

(51) Int. Cl.7 .............................. G06F 7/52; G06F 7/38
(52) U.S. Cl. ....................................... 708/629; 708/523
(58) Field of Search ............................ 708/628–30, 523

(56) References Cited

U.S. PATENT DOCUMENTS 5,751,619 A  *  5/1998  Agarwal et al. ............ 708/629
6,073,156 A  *  6/2000  Purcell et al. ............... 708/629
6,081,823 A  *  6/2000  Purcell et al. ............... 708/629

* cited by examiner

Primary Examiner—Tan V. Mai
(74) Attorney, Agent, or Firm—Vedder, Price, Kaufman & Kammholz

(57) ABSTRACT

A carry save multiplier receives two input values having respective bit lengths A and B and provides sum and carry values, each having bit lengths A+B+1. A carry prediction circuit receives the most significant bit of the sum and carry values and provides an extension bit to be merged with less significant bits of the sum and carry bits. A carry save adder receives the altered sum and carry values, as well as a third input value to provide second sum and carry values. The second sum and carry values are added in a carry propagate adder to form a resulting value. This allows for a faster multiplication to form a product, and the faster addition of this product to another value such as an accumulator value.

8 Claims, 2 Drawing Sheets

SIGN EXTENSION CIRCUIT AND METHOD FOR UNSIGNED MULTIPLICATION AND ACCUMULATION

BACKGROUND OF THE INVENTION

According to a first conventional method, a product of an unsigned multiplication A[5:−2]×B[5:−2] (e.g., 0,000 00.01$_2$×1,01010.10$_2$ or 0.25$_{10}$×42.5$_{10}$) is obtained and added to an accumulator value T[15:0] (e.g., 0,00000,00010, 00000.$_2$=64.$_{10}$) as follows.

The two values A[5:−2] and B[5:−2] are received by an 8×8 carry save multiplier that produces a 16-bit sum value S[11:−4] and a 16-bit carry value C[11:−4]. The sum and carry bits S[−1:−4] and C[−1:−4] that are less significant than the bits of the accumulator value T[15:0] are discarded. The sum and carry values S[11:0] and C[11:0] are extended with zero's to form values S[15:0] and C[15:0] to match the bit weights of the register value T[15:0]. Subsequently, the values S[15:0] and C[15:0] are added to register value T[15:0].

A problem with this first conventional method is that an unwanted carry out often occurs when adding sum and carry values generated by some methods such as booth recoding. Accordingly, a second conventional method of multiplying A[5:−2]×B[5:−2] which eliminates the unwanted carry out has been developed.

Specifically, the two values A[5:−2] and B[5:−2] are received by an 8×8 booth recoded carry save multiplier that produces a 16-bit sum value S[11:−4] (e.g., 00,00000, 10011.0010$_2$=19.125$_{10}$) and a 16-bit carry value C[11:−4] (e.g., 11,11111,10111.1000$_2$=4087.5$_{10}$ unsigned=−8.5$_{10}$ signed). The two values S[11:−4] and C[11:−4] are added in a 2:1 adder in a first stage to form a product P[11:−4] (e.g., 00,00000,01010.1010$_2$=10.625$_{10}$). The unwanted carry out is eliminated during this 2:1 addition by discarding the most significant carry bit.

Bits P[−1:−4] are also discarded and bits P[15:12] are assigned values of 0 to form product P[15:0] (e.g., 0,00000, 00000,01010$_2$=10$_{10}$) thereby matching the bit weights of accumulator value T[15:0]. The product value P[15:0] is added to the accumulator value T[15:0] in a 2:1 adder in a second stage to form a result value T[15:0] (e.g., 0,00000, 00010,01010$_2$=74$_{10}$)

This two stage addition requires a booth recoded carry save multiplication followed by two additions in series using relatively slow 2:1 adders. Therefore, what is desired is a faster circuit and method for performing a booth multiplication (and adding the product to a third (e.g., accumulator) value.

SUMMARY OF THE INVENTION

A carry save multiplier receives two input values having respective bit lengths A and B and provides sum and carry values, each having bit lengths A+B+1. A carry prediction circuit receives the most significant bit of the sum and carry values and provides an extension bit to be merged with less significant bits of the sum and carry values. A carry save adder receives the altered sum and carry values, as well as a third input value to provide second sum and carry values.

In one embodiment, the second sum and carry values are added in a carry propagate adder to form a resulting value. In one embodiment, the carry prediction circuit is an XOR gate that receives the most significant bit of the first sum and carry values. In another embodiment, the circuit is an OR gate that receives the most significant bits and outputs the extension bit to be merged with the less significant bits of at least one of the first sum and first carry bits.

The present invention provides a faster circuit and method for performing a multiplication and adding the product to a third (e.g., accumulator) value.

DESCRIPTION OF THE INVENTION

Figure 1:
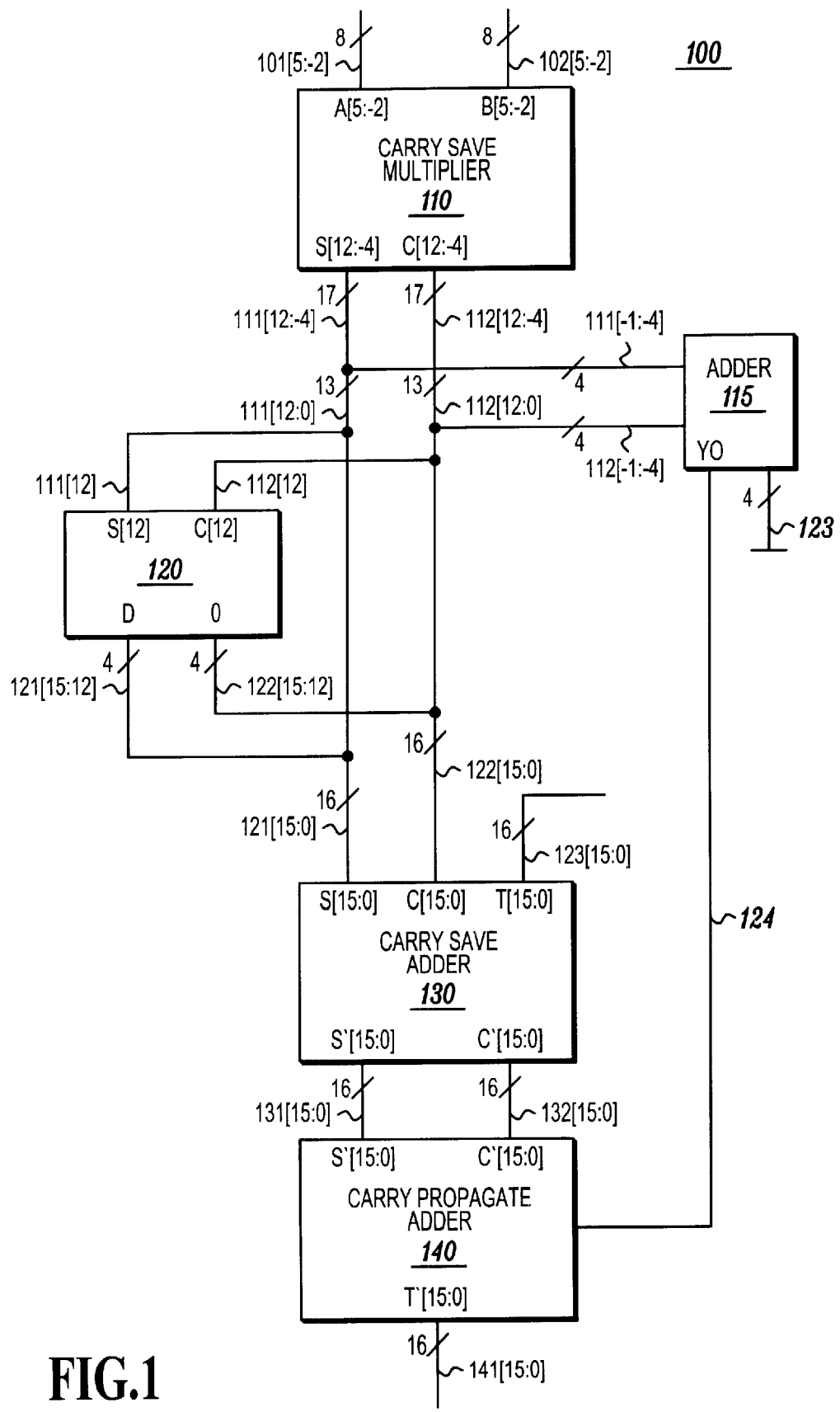
FIG. 1 is a block diagram of a circuit according to the invention.

FIG. 1 is a block diagram of a circuit 100 according to the invention. A carry save multiplier 110 (e.g., a booth recoding carry save multiplier) receives its 8-bit unsigned input values A[5:−2] (e.g., 0,00000.01$_2$=0.25$_{10}$) and B[5:−2] (e.g., 1,01010.10$_2$=42.5$_{10}$) on respective input buses 101 [5:−2] and 102[5:−2]. Throughout this description, the weight of each bit X[n] is equal to 2$^n$. For example, bits A[−2] and B[−2] have a weight of 0.25$_{10}$ while bits A[5] and B[5] have a weight of 32$_{10}$.

Multiplier 110 performs the multiplication A[5:−2]×B[5:−2] and presents the result as a 17-bit sum value S[12:−4] (e.g., 000,00000,10011.0010$_2$=19.125$_{10}$) and a 17-bit carry value C[12:−4] (e.g., 111,11111,10111.1000$_2$=8183.5$_{10}$ unsigned=−8.5$_{10}$ signed) on respective sum and carry buses 111[12:−4] and 112[12:−4]. The bits S[−1:−4] and C[−1:−4] on buses 111[−1:−4] and 112[−1:−4] are received by adder 115. Adder 115 generates sum values on bus 123 which may be used for other purposes or simply discarded. Adder 115 also generates a carry out bit Y0 which is transmitted over bus 124 to be used as a carry in value for adder 140. The weight of the least significant bits S[0] and C[0] of the truncated values S[12:0] and C[12:0] correspond to the least significant weight of a carry save adder ("CSA") 130.

A carry prediction circuit 120 receives its input bits S[12] (e.g., 0) and C[12] (e.g., 1) on respective input lines 111[12] and 112[12]. Carry prediction circuit 120 provides an output bit D on each line of bus 121[15:12] while a 0 is provided on each line of bus 122[15:12]. A bit D of value 1 predicts that a carry bit of value 1 will be generated in CSA 130 from the addition of the most significant of the less significant bits S[11] and C[11]. Otherwise, bit D has value 0. The following Table 1 is a truth table for carry prediction circuit 120.

TABLE 1

| Input bits | | Output Bit |
|---|---|---|
| S[12] | C[12] | D |
| 0 | 0 | 0 |
| 0 | 1 | 1 |
| 1 | 0 | 1 |
| 1 | 1 | 0 |

Figure 2A:
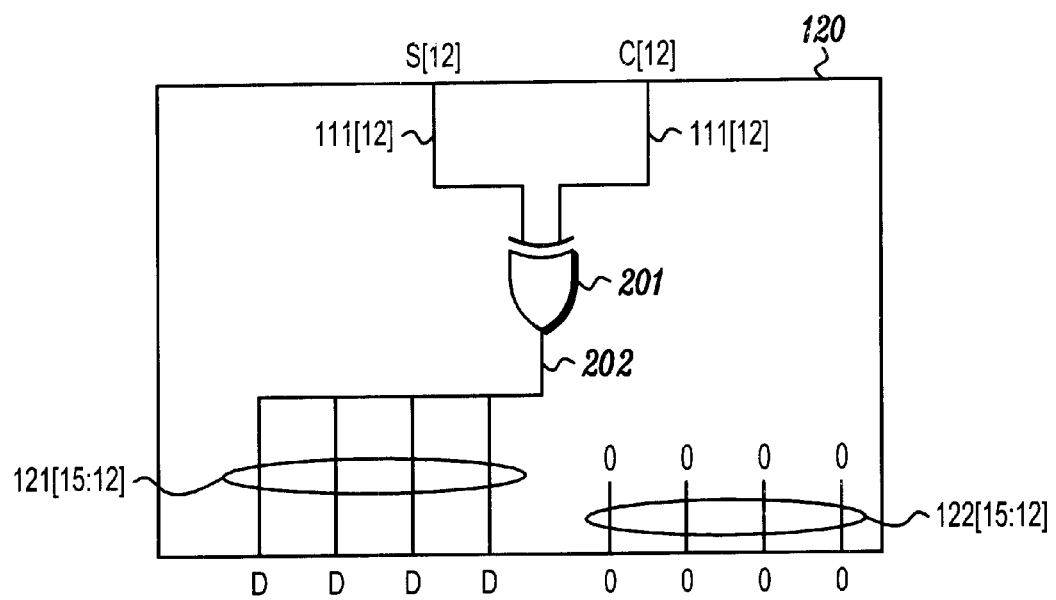
FIG. 2A shows an embodiment of the carry prediction circuit of FIG. 1 using an XOR gate.

FIG. 2A shows a carry prediction circuit 120 in which an XOR gate 201 receives input bits S[12] (e.g., 0) and C[12] (e.g., 1) and provides output bit D (e.g., 1) on line 202 according to Table 1. Line 202 is split off into each line of bus 121[15:12] while a 0 is provided on each line of bus 122[15:12]. Therefore, bit D is provided on each line of bus 121[15:12].

The values represented on buses 121[15:0] and 122[15:0] are defined as respective values S[15:0] (e.g., 1,11100, 00000,10011.$_2$=61459.$_{10}$ unsigned=−4077.$_{10}$ signed) and C[15:0] (e.g., 0,00011,11111,10111.$_2$=4087.$_{10}$). Buses 121 [5:12] and 122[15:12] are merged with respective buses 111[11:0] and 112[11:0] to form respective buses 121[15:0] and 122[15:0]. CSA 130 receives two of its input values S[15:0] and C[15:0] on respective buses 121[15:0] and 122[15:0] and receives a third input value T[15:0] (e.g., 0,00000,00010,00000.$_2$=64.$_{10}$) on input bus 123[15:0]. CSA 130 provides a sum value S'[15:0] (e.g., 1,11111,11101, 00100.$_2$=65476.$_{10}$ unsigned=−92$_{10}$ signed) and carry value C'[15:0] (0,00000,00101,00110.$_2$=166.$_{10}$) according to the following exemplary operation.

| | |
|---|---|
| 1,11100,00000,10011.$_2$ | S[15:0] |
| 0,00011,11111,10111.$_2$ | C[15:0] |
| +0,00000,00010,00000.$_2$ | T[15:0] |
| 1,11111,11101,00100.$_2$ | S'[15:0] |
| 0,00000,00101,00110.$_2$ | C'[15:0] |

S'[n] is 1 only if one or three of S[n], C[n], and T[n] are 1, where n is any integer from 0 to 15. C'[n] is 1 only if two or more of S[n−1], C[n−1], and T[n−1] are 1 where n is any integer from 1 to 15. C'[0] is always 0.

CSA 130 provides signals representing resulting sum and carry values S'[15:0] and C'[15:0] on respective buses 131 [15:0] and 132[15:0]. A carry propagate adder ("CPA") 140 adds the input values S'[15:0], C'[15:01] and Y0 (e.g., 0) received on respective buses 131[15:0], 132[15:0] and 124 and provides an unsigned result value T'[15:0] (e.g., 0,00000,00010,01010.$_2$=74.$_{10}$) on bus 141[15:0] as shown in the following exemplary operation.

| | |
|---|---|
| 0. | Y0 |
| 1,11111,11101,00100.$_2$ | S'[15:0] |
| +0,00000,00101,00110.$_2$ | C'[15:0] |
| 0,00000,00010,01010.$_2$ | T'[15:0] |

The value T'[15:0] (e.g., 74.$_{10}$) is a good approximation of the result of operation T[15:0]+(A[5:−2]×B[5:−2]) {e.g., 64+(0.25×42.5)=74.625$_{10}$}.

The above describes a circuit 100 in which the operation T[15:0]+(A[5:−2]×B[5:−2]) is performed in series by an 8×8 carry save multiplier 110, a carry save adder 130, and a carry propagate adder 140. The carry save adder 130 and the carry propagate adder 140 are faster that the 2:1 adders of the prior art. Therefore, the above describes a faster circuit and method for performing a multiplication and adding the product to a third (e.g., accumulator) value.

Although a specific embodiment of the invention has been described, the embodiment is illustrative only and not limiting. Many variations of the specific embodiment will be recognized by those skilled in the art as being within the scope of the invention.

For example, carry prediction circuit 120 may provide output bit D (e.g., 1) on each line of bus 122[15:12] while a 0 is provided on each line of bus 121[15:12]. Extension prediction circuit 120 may provide output bit D on one of line 121[15] or line 122[15], one of line 121[14] or line 122[14], one of line 121[13] or line 122[13], or one of line 121[12] or line 122[12]. A 0 is provided on the other lines of bus 121[15:12] and bus 122[15:12].

Figure 2B:
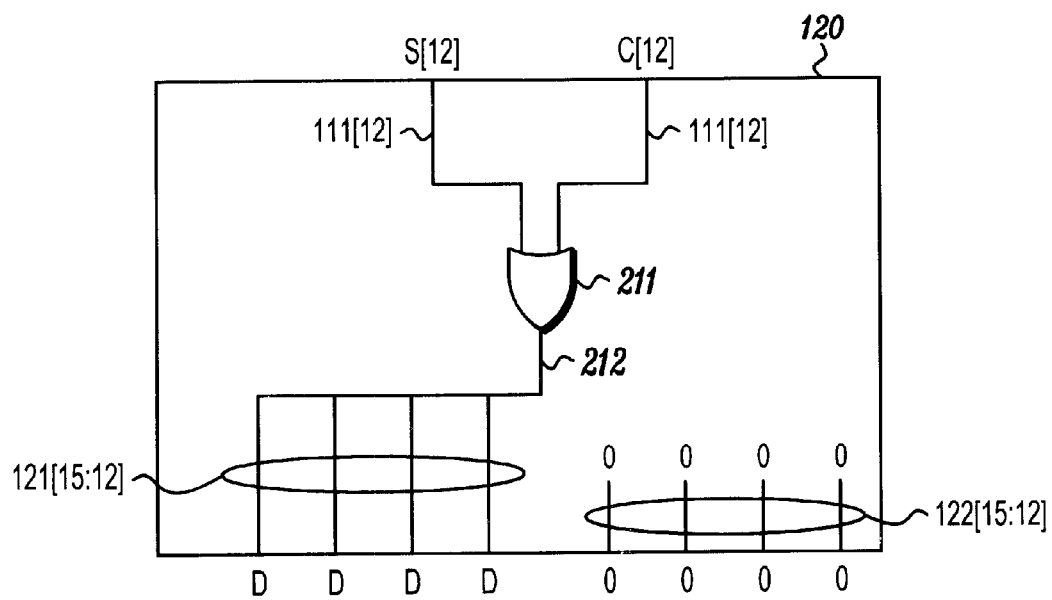
FIG. 2B shows another embodiment of the carry prediction circuit of FIG. 1 using an OR gate.

Although carry prediction circuit 120 may be structured as shown in FIG. 2A, it may also be structured as shown in FIG. 2B when bits S[12] and C[12] can never both be 1 at the same time. For example, S[12] and C[12] may never both be 1 when, carry save multiplier 120 performs some, if not all, types of unsigned booth multiplication.

For example, FIG. 2B shows that an OR gate 211 receives and logically OR's input bits S[12] and C[12] to provide bit D on line 212. Line 212 is split into each line of bus 121[15:12].

Although the above describes that 4 bits of each value S and C are discarded, other amounts of bits may be discarded, or even added, so that the least significant weights of bits of S and C match the least significant weight of CSA 130.

Although the above describes an 8×8 carry save multiplier 110 that provides 17-bit sum and carry values, multiplier 110 may be configured to receive two input values of bit length A and B and provide sum and carry values of bit length A+B+1.

Many other applications and embodiments of the present invention will be apparent in light of this disclosure and the following claims.

What is claimed is:

1. A circuit comprising:

a carry save multiplier configured to receive first and second unsigned input values having respective first and second bit lengths A and B at respective first and second input terminals, the carry save multiplier configured to provide a first sum value and a first carry value of bit lengths A+B+1 at respective first sum and first carry output terminals in response to the first and second unsigned input values, the first sum and first carry values each having a most significant bit and less significant bits;

a carry prediction circuit configured to receive the most significant bit of the first sum value and the most significant bit of the first carry value, the carry prediction circuit configured to provide an extension bit to be merged with the loss significant bits of one of the first sum value of the first carry value to form altered sum and altered carry values; and a carry save adder configured to receive the altered sum value and the altered carry value at respective first sum and first carry input terminals, the carry save adder configured to receive a third unsigned input value at a third input terminal, the carry save adder configured to provide a second unsigned sum and unsigned carry value at respective second sum and carry output terminals in response to the altered sum value, the altered carry value, and the third input value.

2. The circuit of claim 1, further comprising:

a carry propagate adder configured to receive the second unsigned sum and second carry values at respective second sum and carry input terminals, the carry propagate adder configured to provide a resulting unsigned value at an output terminal in response to the second sum and second carry values.

3. The circuit of claim 1, wherein the carry prediction circuit comprises:

an XOR gate configured to receive the most significant bit of each of the first sum and first carry values, the XOR gate configured to provide the output bit.

4. The circuit of claim 1, wherein the carry prediction circuit comprises:

an OR gate configured to receive the most significant bit of each of the first sum and first carry values, the OR gate configured to provide the output bit.

5. A method comprising:

performing a carry save multiplication of a first end second unsigned input value having respective bit lengths A and B;

generating a first sum and carry value based on the carry save multiplication, the first sum and carry value each having a most significant bit and a less significant bit;

generating an extension bit, a value of the extension bit depending on the values of the most significant bits;

merging the extension bit with the less significant bit of either of the first sum or first carry value to form an altered sum value and an altered carry value; and carry save adding the altered sum value, the altered carry value, and a third input value to generate a second unsigned sum value and a second carry value.

6. The method of claim 5, further comprising:

carry propagate adding the second sum value and the second carry value to generate a result value.

7. The method of claim 5, wherein generating an extension bit comprises:

logically XOR'ing the most significant bits of the first sum value and the first carry value to form the extension bit.

8. The method of claim 5, wherein generating an extension bit comprises:

logically OR'ing the most significant bits of he first sum value and the first carry value to form the extension bit.

* * * * *